June 28, 1960  F. KIDD ET AL  2,942,721
CONVEYOR ROLLERS
Filed Oct. 17, 1956  2 Sheets-Sheet 1
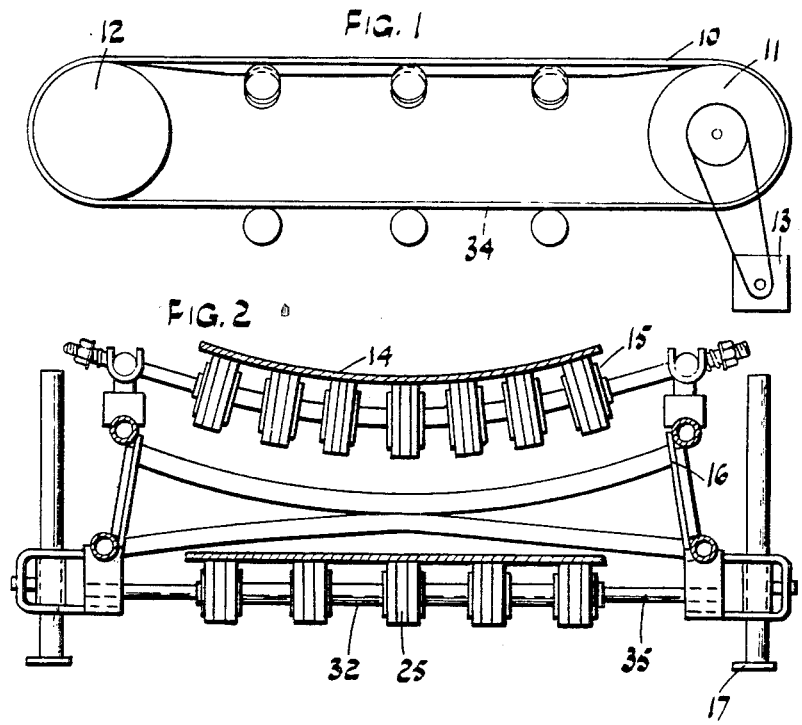
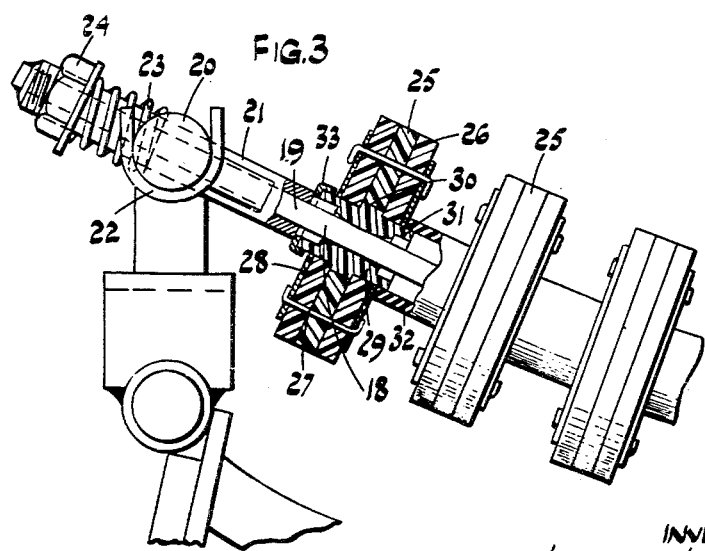
INVENTORS
Frederick Kidd
Thomas Dogue Kidd
BY Lucke & Lucke
ATTORNEY June 28, 1960  F. KIDD ET AL  2,942,721
CONVEYOR ROLLERS
Filed Oct. 17, 1956  2 Sheets-Sheet 2
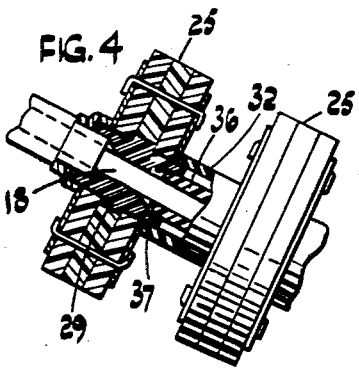
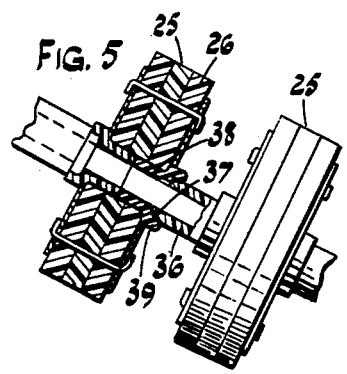
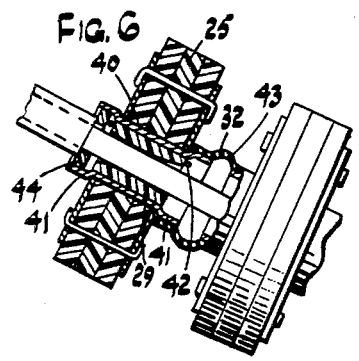
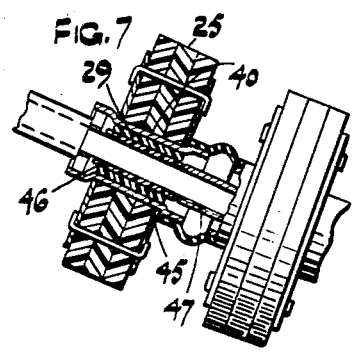
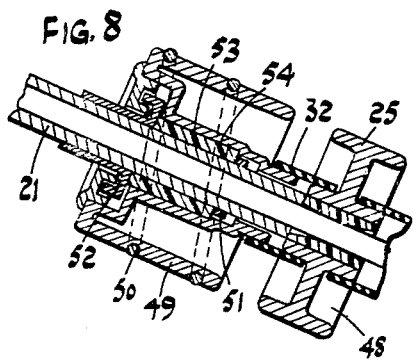
INVENTORS
Frederick Kidd
Thomas Dargue Kidd
By Lucke & Lucke
ATTORNEY : 2,942,721
Patented June 28, 1960

2,942,721
CONVEYOR ROLLERS

Frederick Kidd and Thomas Dargue Kidd, both of Stockton-on-Tees, England, assignors to Fisher & Ludlow Limited, Birmingham, England, a British company Filed Oct. 17, 1956, Ser. No. 616,489

Claims priority, application Great Britain Oct. 20, 1955

5 Claims. (Cl. 198—192)

This invention relates to conveyor rollers for supporting endless conveyor belts in trough configuration.

The primary object of the present invention is the provision of a conveyor roller of simple construction embodying a roller supporting shaft wherein the hitherto customary bearings for rotatably supporting the ends of the shaft are omitted, and in which the shaft is effectively maintained in bowed configuration corresponding to the desired trough configuration of the conveyor belt.

With the foregoing primary object in view a conveyor roller according to the present invention essentially comprises a monolithic shaft, a support for opposite ends of said shaft, means non-rotatably connecting said shaft ends to said support, a plurality of roller elements each mounted rotatably on said shaft at different positions along the length thereof, said shaft being of bowed configuration, and said shaft being inherently rigid to retain its bowed configuration under both loaded and unloaded conditions of the conveyor belt.

Another object of the present invention is to provide a new or improved conveyor roller in which the hitherto customary costly rotatable thrust bearings at each end of the roller shaft are dispensed with.

Another object of the invention is to provide a conveyor roller in which continuous and rapid flexing movement of the roller shaft during the operation of the conveyor is wholly or substantially eliminated.

Another object of the invention is to provide a conveyor roller the shaft of which is formed inexpensively of bar or tube.

Another object of the invention is to provide a conveyor roller embodying a number of roller elements mounted rotatably on the shaft through the medium of bearings of simple construction, e.g. of plain sleeve form whereby the invention is particularly applicable to coal mines, quarries and other situations where the conveyor roller is subjected to substantial dust.

The realisation of such an object enables replacement to be readily effected of a relatively large number of plain sleeve bearings after a period of use in consequence of wear by dust abrasion.

Still another object of the invention is to provide a construction which embodies a number of individual roller elements formed of resilient material, e.g. rubber or like discs built up from scrap rubber or like sheets, a plurality of which can be secured together in side-by-side abutting relationship to form each complete roller element.

Referring to the drawings:

Figure 1 is a diagrammatic side elevation of one form of endless belt conveyor embodying conveyor rollers in accordance with the present invention.

Figure 2 is a cross sectional view of part of the construction depicted in Figure 1.

Figure 3 is a part sectional view to an enlarged scale of a portion of the construction depicted in Figure 2, illustrating the construction of one of the belt supporting roller elements.

Figures 4, 5, 6, 7 and 8 are views similar to Figure 3 depicting the further alternative constructions of roller elements in accordance with this invention.

Referring firstly to Figures 1 to 3 of the drawings, the belt conveyor depicted in particular in Figure 1 is intended for use in conveying bulk material such as, for example, coal, iron ore, or for use in quarrying operations and comprises an endless belt 10 of known form supported at its two ends by a driving drum 11 and idler or return drum 12, the driving drum 11 being power driven in the known manner from an electric motor or other power unit 13.

The upper or load carrying run 14 of the belt 10 is supported from beneath at intervals along its length to trough configuration by means of roller elements 15 embodying the present invention, which roller elements are carried upon an external support in the form of a built up rigid frame indicated generally at 16 and provided with ground engaging feet 17, the particular form of which frame is immaterial as far as this invention is concerned.

Each roller element 15 comprises, as best shown in Figure 3, a central shaft 18 which is most satisfactorily formed as a resilient metal e.g. spring steel bar or tube preferably of circular form peripherally, although a non-circular peripheral shape for the bar or tube, for example, a square shape in the case of a tube could if desired be employed. The two ends 19 of this shaft extend through a hole formed diametrically in a cylindrical trunnion member 20 which also receives an outer end sleeve 21 surrounding the adjacent end 19 of the shaft and connected rigidly thereto, and this trunnion member 20 extends parallel to the length of the adjacent belt portion 14 and is supported for pivotal movement about its central longitudinal axis within a semi-circular yoke 22 carried by the adjacent part of the frame 16, the arrangement permitting of the ends 19 of the shaft 18 occupying different inclinations to the horizontal and thus of the shaft 18 bending in a vertical plane to different bowed configurations depending upon the nature of the belt loading.

The extent to which the shaft 18 is downwardly bowed as shown in Figure 2 under the belt loading is controllable by an adjustable compression spring 23 acting between the adjacent recessed outer side of the trunnion member 20 and an adjusting nut 24 mounted on the outer end of the sleeve 21, which end is screw threaded and in which is secured in any convenient manner, the adjacent outer end of the shaft 18.

The arrangement is such that by increasing the pressure of the spring 23 the shaft 18 tends to assume a lesser bowed configuration for a given loading, a reduction in the spring pressure having the reverse effect.

This nut 24 with its associated compression spring 23 is well adapted to resist the substantial thrust which as explained in the preamble to this specification exists between each end of the flexible shaft and its associated external support.

Each end of the flexible shaft 18 is connected rigidly to the surrounding sleeve 21, and insofar as this sleeve is in threaded engagement with the adjacent nut 24 which is in thrust engagement through spring 23 with trunnion member 20, it will be understood that each end of the shaft is thereby precluded from rotating continuously about the axis of such end during actual operation of the conveyor i.e. when the shaft is subjected to the loading applied thereto from the conveyor belt. In fact, in practice with the above described form of support for the ends 19 of the shaft, the latter during the actual operation of the conveyor is maintained with the plane of its bowing perpendicular to the length of the adjacent portion of the conveyor belt i.e. the shaft does not even pivot about the axis of its two ends in relation to its external support to any significant extent, a feature which is of importance as explained at the end of this specification. The fact that such a non-rotatable connection is provided between each end of the shaft 18 and its associated external support provided by the frame 16 permits of the above described relatively simple form of support to be provided for each end of the shaft well adapted to resist the substantial thrust transmitted from the shaft to the adjacent portion of the frame 16 and arising from the nature of the shaft loading already explained in the preamble of this specification.

Mounted at a relatively close pitch which may be of the order of 3" to 4" along the length of the flexible shaft 18 in between each end sleeve 21, is a plurality of roller elements 25. As illustrated seven such elements are provided but the precise number of these is dependent entirely upon the overall width of the belt and the nature of the belt loading.

Each of these roller elements 25 is built up from a number, conveniently three, sheets 26 formed of soft rubber, preferably scrap rubber or other suitable flexible material e.g. a polyvinyl chloride plastic which are secured together in side-by-side abutting, and if desired, adhesively bonded relationship, by means of rivets 27 passing through metal end plates 28 at each side of the so formed circular disc-like assembly.

This assembly is apertured centrally to accommodate a bearing sleeve 29 which may be formed of hard rubber or nylon or other suitable non-metallic material, which bearing sleeve is located against axial movement relative to the remainder of the roller element by forming it centrally of its length with a peripheral rib 30 which engages between the two outer rubber sheets 26 whose inner diameter is less than the inner diameter of the remaining or central rubber sheet of each roller element assembly and this bearing sleeve 29 may additionally be bonded to the inner periphery of the annular rubber discs 26 beyond opposite ends of which it axially extends at 31.

Each sleeve bearing 29 is internally flared near its two ends so as to be adapted to engage rotatably with the shaft 18 only, adjacent the centre portion of the sleeve, the arrangement serving to reduce rotational friction between each roller element and the shaft, and at the same time permit of the roller elements moving angularly in a vertical plane containing the shaft axis to a limited extent to accommodate local variations in the trough shape of the conveyor belt.

Ingress of dust or dirt into the bearing provided as above described between each roller element and the shaft 18 is prevented as far as possible by flexible dust excluding sleeves 32 which extend between mutually adjacent roller elements, these sleeves being conveniently formed of rubber and engaging closely with the opposed faces of the metal plates 28 as well as on their interior engaging closely with the exterior of the bearing sleeve extensions 31. These dust excluding sleeves 32 by reason of their flexibility do not impair in any way the aforesaid flexing of the shaft 18.

In addition dust excluding end caps 33 are provided between each end sleeve 21 and the end of the bearing sleeve 29 of the adjacent end roller element.

Desirably, the dust excluding sleeves 32 are of such a length that they are slightly compressed when the several roller elements are assembled together on the shaft 18 thereby ensuring that the sleeves maintain their dust excluding effectiveness irrespective of the particular bowed configuration of the flexible shaft 18 which may obtain when the conveyor is in operation.

The bearing sleeves 29 by reason of their non-metallic nature preferably operate without the use of any lubricant, although, if desired, the whole of the space between each bearing sleeve and dust excluding sleeve and the shaft 18 may initially be filled with grease, the replacement of which would not normally be necessary during the working life of each roller assembly.

The lower or return run 34 of the conveyor belt may be supported on return rollers each formed of a number of roller elements 25 identical to those above described and mounted similarly on a supporting shaft 35 which in this case is of rigid construction in that flexing of the shaft is not required, while insofar as the return run 34 of the belt is not supporting any load, the number of roller elements 25 required for each of these shafts 35 is less and these may similarly be spaced from one another by flexible dust excluding sleeves 32 in like manner to the construction already described.

In Figure 4 is depicted a slight modification of the preceding construction in which adjacent roller elements bearing sleeves 29 are spaced apart from one another by inner spacing sleeves 36 additional to the outer combined dust excluding and roller spacing sleeves 32 of the preceding construction, which inner spacing sleeves 36 are formed of the same material as the sleeves 29 aforementioned and extend within annular recesses 37 formed in the adjacent end of each bearing sleeve 29.

These inner sleeves 36 engage closely within the interior of the recesses 37 and serve to assist the outer dust excluding sleeves 32 in preventing dust or dirt from entering between the bearing sleeves 29 and the flexible shaft 18.

In Figure 5 is depicted a further construction somewhat simpler than the construction depicted in Figure 4 in which each bearing sleeve is formed as two tubular members 38 which are outwardly flanged at 39 at their one end, the other end of each of these two members being inserted within the central opening of the three rubber or like sheets 26 forming the roller assembly, which sheets are each of the same bore and as will be seen from the drawing, these inner ends of the bearing members 38 abut with one another centrally of each roller element 25 with their flanges 39 then in engagement with the adjacent outer end face of each roller element.

In this arrangement the outer dust excluding sleeves 32 are omitted, the inner sleeves 36 of the preceding construction being provided which extend within the recesses 37 of each flanged end 39 of the bearing sleeve members 38 so as to serve as combined dust excluders and spacer members as in the preceding construction.

In the further construction depicted in Figure 6 each assembly of rubber or like sheets 26 is mounted upon a metal ferrule 40 which extends beyond each end of the assembly and is there outwardly flanged at 41 and the bearing sleeves 29 are mounted within these ferrules, being located therein against axial movement by pins 42 which are passed tangentially through holes in the flanged ends of the ferrules, or, alternatively, in place of these pins the flanged ends of the ferrules may have indented therein local inwardly extending projections.

Dust excluding sleeves 32 are provided between adjacent roller element assemblies as in the preceding construction, which dust excluding sleeves embrace tightly the exterior of the ferrule flanges 41, which flanges each have an axial length less than half the required distance between adjacent roller elements and thereby permit of the desired flexing of the shaft 18, and insofar as the effective flexible length of each dust excluding sleeve 32 is for the same roller element pitch less than that of the preceding constructions, these sleeves 32 are formed to a lesser thickness so as to extend outwardly at 43 when axially compressed during assembly as in the case of the construction depicted in Figure 3. The construction is such that an effective dust excluding seal is provided between adjacent roller elements 25 while adjacent the outer ends of the two outer elements of each roller assembly, dust excluding rings 44 are inserted in the adjacent ferrule flanges 41.

A modification of the construction depicted in Figure 6 is shown in Figure 7 in which each bearing sleeve 29 is of built-up construction comprising an outer bush 45 and an inner bearing bush proper 46. In this arrangement the bushes 45 would be bonded to the metal of the ferrule 40 and the inner bushes 46 are located by flexible or other locating bushes 47 which extend between the opposed ends of mutually adjacent inner bearing bushes 46.

Instead of forming the roller elements 25 of soft rubber or equivalent flexible material, these roller elements may be formed of metal or other rigid material as shown in Figure 8, and may be supported rotatably from the flexible shaft by means of non-metallic bearing sleeves 29 of form similar to those depicted in Figure 6, which bearing sleeves would be bonded within the bore of the metal or other material forming each roller element 25 and the flexible dust excluding sleeves 32 would extend within annular recesses 48 provided on each side of each roller element to which the interior of these sleeves 32 would also be bonded so as effectively to space the adjacent roller elements by the requisite distance as well as to exclude dust and dirt from the bearing surfaces.

In this particular arrangement each end of each shaft 18 is provided with a belt centering member comprising a drum-like belt centering element 49 having in the known manner a helically arranged belt engaging rib 50, the helices on the two drums 49 of each shaft 18 being of opposite hand in the known way and this drum would be freely rotatable on the adjacent shaft end sleeve 21 against which it would be secured against axial movement in either direction by its engagement with locating rings 51, 52 carried on the sleeve 21 between which locating rings would be disposed a bearing bush 53 to provide the necessary bearing support for each belt centering drum, each bearing bush 53 being preferably of non-metallic form so as desirably to be self lubricating in the manner already described. This bearing bush 53 is disposed within an inner tubular portion 54 of the drum 49 which is adapted to engage with the locating rings 51, 52 referred to and this projects beyond the inner end of each drum towards the adjacent roller element 25 into the adjacent dust excluding sleeve 32 with the interior of which it engages closely so as there to provide an effective dust excluding seal.

With all of the above constructions it will be appreciated that a bearing of relatively simple construction inherently adapted to be self lubricating is provided between each individual roller element 25 and the shaft 18 instead of providing a relatively complex bearing which must of necessity be periodically lubricated between the shaft and its end supports as in the case of the hitherto known construction earlier referred to.

Thus the present invention provides a conveyor roller for supporting to trough configuration the load carrying run of an endless conveyor belt, which roller is of a particularly suitable construction and is well adapted to continue efficiently in use without attention for extended periods.

Further, as the shaft 18 is constructed as a resilient bar or tube as opposed to constructing it as a cable, the invention possesses in addition to the advantages already mentioned arising from the use of a resilient bar or tube for this purpose, the further very important advantage that since a bar or tube as opposed to a cable is relatively rigid, the plane in which the bar or tube is bowed will always be maintained in the designed and desired position perpendicular to the length of the adjacent portion of the belt thereby supported.

This arises from the fact that in accordance with the invention the shaft is not mounted for rotational movement at its ends and the shaft ends are supported in a sufficiently rigid manner as to prevent the central portion of the shaft moving forwardly in relation to the ends of the shaft under the force transmitted to the shaft by the forward movement of the belt, particularly when this is started under load. This forward movement of the roller elements with the belt which occurs in the case when the flexible shaft is in the form of a cable, does increase the initial power required to start the movement of a loaded belt, and in a long belt involving a large number of these rollers, including their associated shafts, may necessitate the provision of a substantially larger power unit than is necessary with an otherwise identical installation where the conveyor rollers are constructed in accordance with the invention, i.e. with their shafts as resilient bars or tubes.

What we claim then is:

1. In a troughed endless belt conveyor, a belt supporting roller element comprising a shaft consisting of a resilient metal member of elongated configuration which extends continuously between opposite lateral edges of the troughed conveyor belt, said member being preformed to bowed configuration, means adapted to support opposite ends of said member with the plane of bowing thereof perpendicular to the length of the adjacent troughed belt, said supporting means comprising a trunnion bearing member at each end of said elongated shaft member, a bracket supporting each trunnion bearing member, an abutment on each of the extremities of the shaft member, a spring between the abutment and the trunnion bearing member, said shaft member being of sufficient stiffness as inherently to maintain a bowed configuration in said perpendicular plane while being sufficiently resilient as to flex in said plane in accordance with different belt loadings, and a plurality of rollers mounted rotatably on said shaft.

2. In a troughed endless belt conveyor, a belt supporting roller element comprising a shaft consisting of a resilient metal member of elongated configuration which extends continuously between opposite lateral edges of the troughed conveyor belt, said member being preformed to bowed configuration, means adapted to support opposite ends of said member with the plane of bowing thereof perpendicular to the length of the adjacent troughed belt, said supporting means comprising a trunnion bearing member at each end of said elongated shaft member, a bracket supporting each trunnion bearing member, an abutment on each of the extremities of the shaft member, a spring between the abutment and the trunnion bearing member, said shaft member being of sufficient stiffness as inherently to maintain a bowed configuration in said perpendicular plane while being sufficiently resilient as to flex in said plane in accordance with different belt loadings, and a plurality of centrally bored rollers mounted rotatably on said shaft, each of said roller bores having a resilient non-metallic shaft engaging bearing surface.

3. In a troughed endless belt conveyor, a belt supporting roller element comprising a shaft consisting of a resilient metal member of elongated configuration which extends continuously between opposite lateral edges of the troughed conveyor belt, said member being preformed to bowed configuration, means adapted to support opposite ends of said member with the plane of bowing thereof perpendicular to the length of the adjacent troughed belt, said supporting means comprising a trunnion bearing member at each end of said elongated shaft member, a bracket supporting each trunnion bearing member, an abutment on each of the extremities of the shaft member, a spring between the abutment and the trunnion bearing member, said shaft member being of sufficient stiffness as inherently to maintain a bowed configuration in said perpendicular plane while being sufficiently resilient as to flex in said plane in accordance with different belt loadings, a plurality of centrally bored rollers mounted rotatably on said shaft, spacing means maintaining adjacent rollers out of contact with one another, each of said roller bores having a resilient non-metallic shaft engaging bearing surface which is tapered outwardly in each of two opposite directions axially of said shaft.

4. In a troughed endless belt conveyor, a belt supporting roller element comprising a shaft consisting of a resilient metal member of elongated configuration which extends continuously between opposite lateral edges of the troughed conveyor belt, said member being preformed to bowed configuration, means adapted to support opposite ends of said member with the plane of bowing thereof perpendicular to the length of the adjacent troughed belt, said supporting means comprising a trunnion bearing member at each end of said elongated shaft member, a bracket supporting each trunnion bearing member, an abutment on each of the extremities of the shaft member, a spring between the abutment and the trunnion bearing member, said shaft member being of sufficient stiffness as inherently to maintain a bowed configuration in said perpendicular plane while being sufficiently resilient as to flex in said plane in accordance with different belt loadings, a plurality of centrally bored rollers mounted rotatably on said shaft, flexible dust excluding sleeves extending between mutually adjacent ends of said rollers, said sleeves maintaining said rollers spaced relatively apart in a direction along the axis of said shaft.

5. In a troughed endless belt conveyor, a belt supporting roller element comprising a shaft consisting of a resilient metal member of elongated configuration which extends continuously between opposite lateral edges of the troughed conveyor belt, said member being preformed to bowed configuration, means adapted to support opposite ends of said member with the plane of bowing thereof perpendicular to the length of the adjacent troughed belt, said supporting means comprising a trunnion bearing member at each end of said elongated shaft member, a bracket supporting each trunnion bearing member, an abutment on each of the extremities of the shaft member, a spring between the abutment and the trunnion bearing member, said shaft member being of sufficient stiffness as inherently to maintain a bowed configuration in said perpendicular plane while being sufficiently resilient as to flex in said plane in accordance with different belt loadings, a plurality of centrally bored rollers mounted rotatably on said shaft, flexible dust excluding sleeves extending mutually adjacent ends of said rollers, said sleeves maintaining said rollers spaced relatively apart in a direction along the axis of said shaft, and each of said roller bores having a resilient non-metallic shaft engaging bearing surface which is tapered in each of two opposite directions axially of said shaft.

References Cited in the file of this patent

UNITED STATES PATENTS

| | | |
|---|---|---|
| 909,833 | Vrooman | Jan. 12, 1909 |
| 1,332,815 | De Young | Mar. 2, 1920 |
| 1,881,267 | Drexler | Oct. 4, 1932 |
| 2,127,643 | Glossmann | Aug. 23, 1936 |
| 2,169,624 | Weiss | Aug. 15, 1939 |
| 2,246,086 | Austin | June 17, 1941 |
| 2,781,124 | Troller | Feb. 12, 1957 |

FOREIGN PATENTS

| | | |
|---|---|---|
| 844,427 | Germany | July 21, 1952 |
| 1,037,156 | France | Apr. 29, 1953 |